Oct. 27, 1925. 1,559,073
N. GHERASSIMOFF
PROGRESSIVE CHANGE SPEED GEAR
Filed Sept. 5, 1923   2 Sheets-Sheet 1
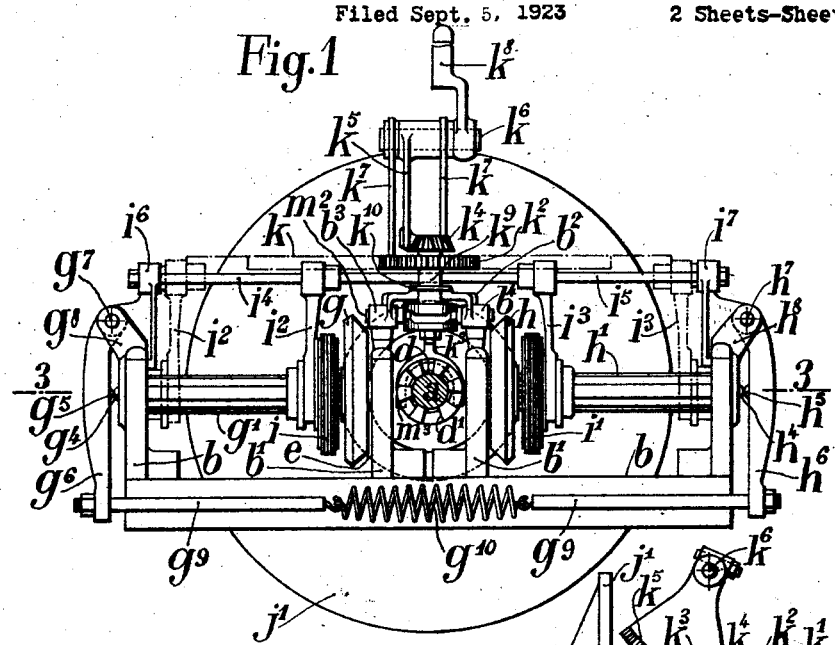
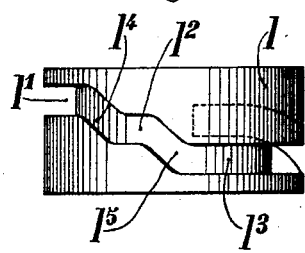
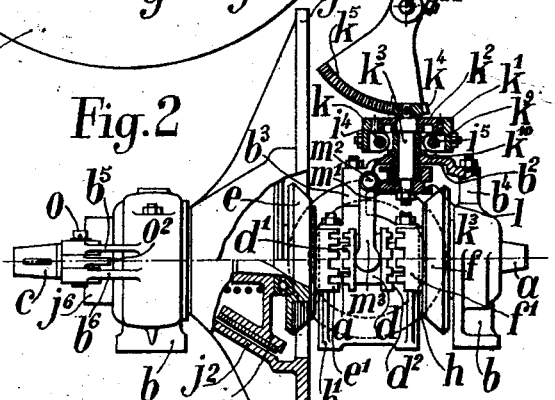
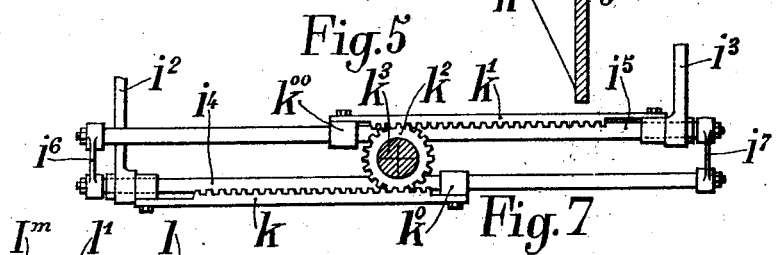
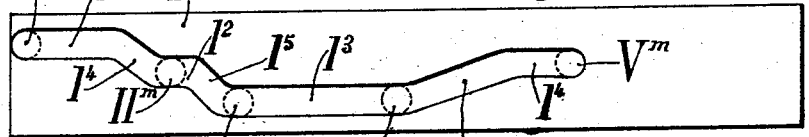
Inventor
N. Gherassimoff
By Marks & Clerk, Attys.

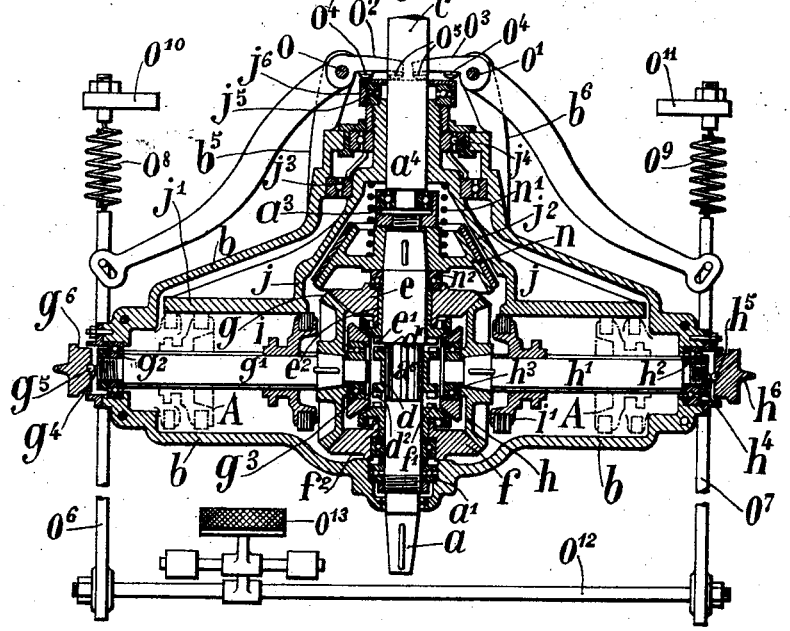
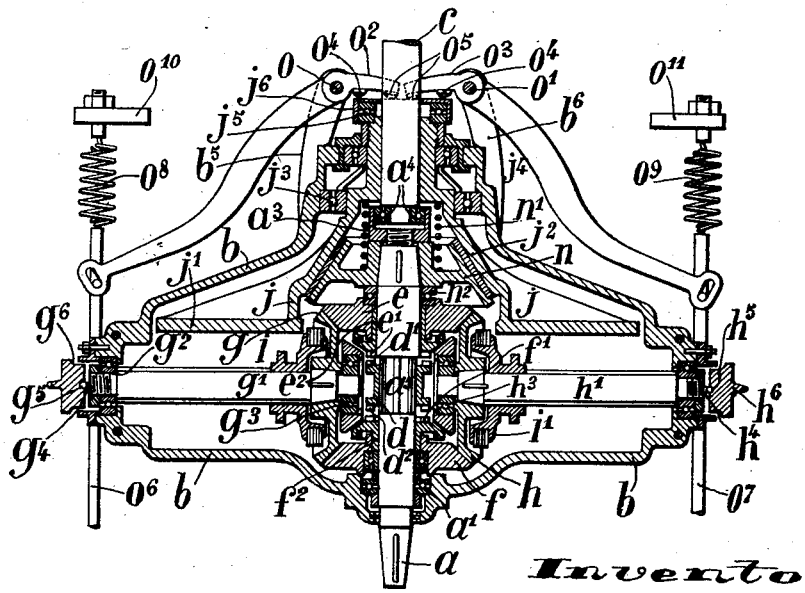

Patented Oct. 27, 1925.

1,559,073

UNITED STATES PATENT OFFICE.

NICOLAS GHERASSIMOFF, OF LE VESINET, FRANCE.

PROGRESSIVE CHANGE-SPEED GEAR.

Application filed September 5, 1923. Serial No. 661,081.

*To all whom it may concern:*

Be it known that I, NICOLAS GHERASSIMOFF, a citizen of the Russian Federative Republic, residing 19 Boulevard d'Angleterre, Le Vesinet, Seine-et-Oise, France, have invented new and useful Improvements in a Progressive Change-Speed Gear, of which the following is the specification.

This invention relates to a progressive change-speed gear; this change speed gear is of the type in which the connection between the driving and driven shafts is ensured by the friction of rollers on a circular plate, the rollers rotating about axes at right angles to the axis of the plate and concurring with the same. In these mechanisms, the progressive variation of the speed is obtained by causing the rollers to slide on the shafts which drive them; for throwing out of gear and in gear, it is necessary to move the plate towards or from the rollers or to provide a clutching device for the driving member; finally, for determining the reversal, it is necessary to alter the direction of actuation of the driving member.

The essential object of the invention is to permit by the operation of a single member capable of receiving a single movement only, of obtaining:

1.—The progressive variation of the speed,

2.—The direct engagement of the driving and driven shafts,

3.—The throwing out of gear of the driven shaft,

4.—The alteration of the direction of actuation of the driven member.

The throwing out of gear by relatively moving apart the rollers and the plate is obtained by a separate control.

It will be noted that:

1.—The progressive variation of the speed necessitates the realization of at least one movement of translation: this movement is that of the rollers on their shaft.

2.—The throwing out of gear of the driven member and the reversal of this member necessitates various translations effected according to the common direction of the driven shaft, that is to say at right angles to the preceding translation.

3.—These translations different in magnitude and in direction must sucessively take place, in a predetermined order.

The mechanism forming the subject-matter of the invention realizes these conditions, as indicated, by the operation of a single member, constituted by a lever, receiving a single movement, which is a movement of rotation of this lever about a fixed axis.

This mechanism is characterized, to that effect, in that the rotation of the control lever is transmitted to an axis on which are rigidly mounted a pinion and a grooved cam, the pinion gearing with racks which determine the translation of the rollers, that is to say the change of speed, and the grooved cam controlling the rotation about an axis at right angles to the first one, of a lever which controls the translation of a sliding member so as to produce the throwing out of gear and the reversal.

On the other hand, it must be considered that, when the direct drive is effected between the driving shaft and the driven shaft, the change speed gear must be put out of action. In this respect, another feature of the change speed gear forming the subject-matter of the invention resides in the fact that the friction surface of the plate movable in translation on the driven shaft subjected to the action of springs, forms a crown which is constantly pressed against the driving rollers, the springs having besides for effect, when the rollers are brought beyond the inner edge of the friction crown and thus put out of action, to project the said plate in the direction of the engine, until a female cone carried by the same comes in contact with a corresponding male cone, rigidly mounted on the driving shaft, so as to effect the direct drive.

Finally, the separate control for throwing out of gear by moving apart the plate and rollers is characterized in that the action exerted on the control member for the separate unclutching is antagonistic to that of the springs which hold the plate in contact with the rollers, so that these springs being put out of action, a spring acting in reverse direction to the first ones, but much less powerful, can move the plate away from the rollers until the contact is suppressed.

In the acompanying drawings illustrating, but by way of example only, a method of construction of the mechanism in accordance with the present invention:

Fig. 1 is a front elevation with partial section according to the broken line 1—1 of Fig. 3.

Fig. 2 is a partial side view, partly in section, of Fig. 1.

Fig. 3 is a horizontal section according to line 3—3 of Fig. 1.

Fig. 4 is a view similar to that of Fig. 3, certain of the parts being in a different position.

Fig. 5 is a partial plan view of Fig. 1.

Fig. 6 illustrates separately a driving cam shown in Figs. 1 and 2.

Fig. 7 illustrates the same cam, developed.

$a$ designates the driving shaft mounted, at one of its ends in a bearing $a^1$ arranged in a casing or frame $b$, whilst its other end is screwed in a ring $a^2$ within which is supported the driven shaft $c$, through the medium of a bearing $a^4$.

At its middle part, the shaft $a$ is fluted at $a^5$ and receives a sliding member such as a claw sliding member $d$, the arrangement being such that this clutch is always driven by the shaft, whilst being capable of sliding on the latter. This sliding member $d$ is provided with two series of claws $d^1$, $d^2$, formed on its two faces. On each side of its middle fluted portion $a^5$ the driving shaft $a$ is smooth and carries two friction cones or bevel pinions $e$, $f$, connected by a resilient coupling with the sleeves $e^2$, $f^2$, loose on the said shaft and having claws $e^1$, $f^1$ situated opposite the claws $d^2$, $d^1$ respectively of the sliding member $d$, so that by sliding on the said shaft, this sliding member can be brought in engagement either with the cone $e$ through the medium of the claws $d^2$, $e^1$, or with the cone $f$ through the medium of the claws $d^1$, $f^1$.

The friction cones or bevel pinions $e$, $f$, are constantly in engagement with friction cones or pinions $g$, $h$, keyed on secondary shafts $g^1$, $h^1$, supported at each end in bearings $g^2$, $h^2$, $g^3$, $h^3$, the bearings $g^3$, $h^3$ being arranged in a suitable upright $b^1$ of the casing. At their outer end, the secondary shafts $g^1$, $h^1$, are provided with thrust steps $g^4$, $h^4$, against which bears another thrust step $g^5$, $h^5$. The steps $g^5$, $h^5$, are secured on levers $g^6$, $h^6$, which, pivoted at $g^7$, $h^7$ on lugs $g^8$, $h^8$, of the casing $b$, are connected together by two rods $g^9$, $h^9$ between which is interposed a spring $g^{10}$ acting by traction, the arrangement being such, as will be seen hereafter, that, under the stress exerted by the said spring, the secondary shafts tend to be driven back inwardly and to ensure a good contact of their friction cones or pinions $g$, $h$, with the friction cones or pinions $e$, $f$.

The secondary shafts $g^1$, $h^1$ are fluted and each carry a friction roller $i$, $i^1$, capable of coming in contact with a friction plate $j$ having, on the one hand, a plane portion $j^1$ the lower face of which cooperates with the rollers $i$, $i^1$ and, on the other hand, a conical portion $j^2$ serving for the direct drive, as will be seen hereafter, this friction plate $j$ being mounted on the driven shaft $c$, with which it is rendered rigid by flutes.

The friction rollers $i$, $i^1$ are driven by forks $i^2$, $i^3$ so mounted as to be capable of sliding on rods $i^4$, $i^5$ respectively, Figs. 1, 2 and 5, these rods being held at a suitable distance apart by supports $i^6$, $i^7$ forming a part of the casing $b$. To the forks $i^2$ $i^3$ are connected racks $k$, $k^1$ both gearing with a wheel $k^2$ keyed on an axis $k^3$, Fig. 2, the other end of each rack being connected to a sleeve $k^0$, $k^{00}$ respectively, sliding also on the shafts $i^4$, $i^5$ in order to ensure a good rectilinear guiding of the said racks.

On this axis is, moreover, keyed a pinion $k^4$ gearing with a segment $k^5$ (Fig. 1) secured on a shaft $k^6$ arranged in uprights $k^7$, $k^7$. An operating lever $k^8$ secured on the shaft $k^6$ allows the operation, the description of which is given below. On the shaft $k^3$ is also secured a sleeve $k^9$ which, provided with a flange $k^{10}$, rests on a cross bar $b^2$ connecting two standards $b^3$, $b^4$ forming a portion of the casing or frame $b$.

On the said shaft is, moreover, secured a cylindrical cam $l$, Figs. 1, 2, 6 and 7, the groove of which is formed of horizontal parts $l^1$, $l^2$, $l^3$, Fig. 7, and of oblique parts $l^4$, $l^5$, $l^6$, these latter being connected to the first ones. In this cam enters the end of the lever $m$ illustrated in dotted lines in Fig. 2, this lever being mounted in an arm $m^1$ secured on an axis $m^2$, which carries a fork $m^3$, the ends of which take hold on each side of the claw sliding pinion and control it.

The various positions occupied by the lever $m$ are indicated in dotted lines in Fig. 7, viz, $I^m$, $II^m$, $III^m$ $IV^m$ and $V^m$.

At the upper end of the driving shaft $a$ (Fig. 3) is keyed a direct drive cone $n$ (Fig. 2) adapted to come in engagement with the inner face of the conical portion $j^1$ of the plate $j$. A spring $n^1$ constantly tends to move this cone away from the conical portion $j^2$. A thrust bearing can be interposed between the cone $n$ and the plate $e$. As will be seen hereafter, this cone $n$ preserves at all times the position indicated in Fig. 3.

The friction plate $j$ is supported by bearings $j^3$, $j^4$ and is provided, at its outer end, with a bearing $j^5$ on which bears an abutment flange $j^6$ which is centered on the driven shaft $c$ and can slide on the latter.

On a pair of standards $b^5$, $b^6$, Figs. 2 and 3, forming a portion of the casing $b$, are mounted axes $o$, $o^1$ each carrying a bent lever $o^2$, $o^3$ each provided with two bearing steps $o^4$, $o^5$ arranged at a different distance from their axes $o$, $o^1$ and adapted to bear on the abutment flange $j^6$ Fig. 3. The bent levers $o^2$, $o^3$ are jointed to rods $o^6$, $o^7$ the upper end of which is connected by a returning spring $o^8$, $o^9$ to a fixed point $o^{10}$, $o^{11}$ of the casing, whilst their lower end is connected to a cross bar $o^{12}$ capable of being actuated by a pedal $o^{13}$; the arrangement being such that if the latter is depressed, the rods $o^6$, $o^7$ cease to be subjected to the traction exerted by the springs $o^8$, $o^9$ and do not cause the bent levers $o^2$, $o^3$ to rock, so that the bearing steps $o^4$, $o^4$, $o^5$, $o^5$ do not bear on the abutment flange $j^6$ and the plate $j$ is then free, by sliding on the driven shaft $c$, to reascend under the thrust of the spring $n^1$; this having for effect to disengage the plane portion $j^1$ of this plate from the friction rollers $i$, $i^1$.

The operation is as follows. It will be supposed that the parts are in the position of rest indicated in Fig. 3 in which the end of the lever $m$ is in the position $II^m$, (Fig. 7) which is that of the dead center, that is to say the sliding member $d$ is disengaged from each of the friction cones $e$, $f$. The driving shaft $a$ transmits therefore its movement to the said sliding member as well as to the direct drive cone $n$, but without actuating any of the other movable parts of the mechanism. As the pedal $o^{13}$ is not depressed, the springs $o^8$ $o^9$ exert their traction on the rods $o^6$, $o^7$ and, through the medium of the bent levers $o^2$, $o^3$, the steps $o^4$, $o^4$, $o^5$, $o^5$ firmly bear on the abutment flange $j^6$, this having for effect, notwithstanding the spring $n^1$ to push the friction plate downwardly and to bring the plane portion $j^1$ of the latter in contact with the friction rollers $i$, $i^1$. The shaft $a$ being in movement, the mechanism is then ready to act.

The operation is effected by means of the single lever $k^8$, Fig. 1, which is moved by hand, so that, through the medium of the segment $k^5$, pinion $k^4$, toothed wheel $k^2$ and racks $k$, $k^1$, it will be possible to determine a rectilinear displacement of the forks $i^2$, $i^3$, and to actuate the friction rollers $i$, $i^1$ along their respective shafts $g^1$, $g^1$. It is indispensable to previously depress the pedal $o^{13}$, so as to momentarily move the plane portion $j^1$ away from the rollers $i$, $i^1$, through the medium of the parts $o^{12}$, $o^6$, $o^7$, $o^2$ and $o^3$, the spring $n^1$ being then free to act and to allow the plate $j$ to move again upwardly. While the said pedal is depressed, it will therefore be possible when the lever $k^8$ is manipulated, to freely move the rollers $i$ without encountering any unnecessary resistance.

If now, the lever $k^8$ is actuated, it is caused to execute a movement having a sufficient amplitude so that the end of the lever $m$ passes from the position $II^m$ which is that of the dead centre, to the position $III^m$ which is that of the forward running at the smallest speed. The distance comprised between the point $III^m$ and the point $IV^m$ represents the amplitude of the movement which can be imparted, for forward running, to the rollers $i$, $i^1$ relatively to the plane portion $j^1$ of the plate $j$. It will be easily understood that when the said rollers occupy the position shown in Fig. 3, the driving shaft $a$, through the medium of the members $d$, $e$, $g$, $h$ and of the rollers $i$, $i^1$ transmits to the plate $j$ a movement at the highest speed, with the exclusion of the direct drive. This position of the rollers $i$, $i^1$ corresponds to the position $IV^m$ of the end of the lever $m$, whilst, on the contrary, when the friction rollers $i$, $i^1$ occupy a position near to the extreme position, that is to say that shown at A in Fig. 3, the end of the lever $m$ is at the position $III^m$ and the speed transmitted is the minimum speed. The series of variable speeds is therefore comprised between the positions $III^m$ and $IV^m$ of the end of the lever $m$ controlled by the hand of the driver by means of the single lever $k^8$.

If, by continuing to actuate his lever $k^8$, the driver further moves the friction rollers $i$, $i^1$ towards the driving shaft $a$ by always unclutching, if need be, at each operation, the said rollers abandon the position indicated in full lines in Fig. 3 and take their extreme position indicated in Fig. 4 in which they enter in a corresponding recess of the plates $g$, $h$.

From this moment, the plate $j$ being no longer in contact with the said rollers, is free to descend, under the action of the thrust exerted by the bent levers $o^2$, $o^3$ and the bearing steps $o^4$, $o^4$, $o^5$, $o^5$, by means of the springs $o^8$, $o^9$; this having for result to bring the conical portion $j^2$ of the plate $j$ in contact with the direct drive cone $n$. The transmission of the movement is then effected with suppleness in direct drive and the end of the lever $m$ which controls the cam $l$ occupies the position $V^m$, Fig. 7.

If it is desired to effect a change of speed, unclutching is first effected by means of the pedal $o^{13}$, this allowing the plate $j$ to move again upward under the thrust of the spring $n^1$, then the lever $k^8$ is again operated, but in reverse direction, so that the end of the lever $m$, abandoning the position $V^m$, Fig. 7, moves down the incline $l^6$ and takes the position $IV^m$ which is that corresponding to the position occupied by the rollers $i$, $i^1$, position indicated in full lines in Fig. 3.

The lever $k^8$ continues to be operated until the end of the lever $m$ takes the position $III^m$ in which the transmission of the movement imparted by the friction rollers $i$, $i^1$ to the plate $j$ is effected at the smallest speed (that is to say the position A) after which the said operation is still continued, this having for effect to cause the end of the lever $m$ to re-ascend the incline $l^6$ and to bring it in the position $II^m$ which is that of the dead centre, that is to say that in which the sliding member abandons the position it was occupying, its claws $d^3$ in engagement with the claws $e^1$ of the cone $e$, Fig. 3. The disengagement being thus effected, no movement is any longer imparted to the secondary shafts $g^1$, $h^1$.

When it is then desired to run backward, the lever $k^8$ is again actuated, so that, ascending the incline $l^4$ the end of the lever $m$ comes to the position $1^m$ which is that of reverse, position in which the sliding member $d$ is brought, through its claws $d^1$, in engagement with the claws $f^1$ of the cone $f$, so that the driving shaft $a$ transmits a movement in the reverse direction to the secondary shafts $g^1$ $h^1$.

Attention must be called to the fact that the bent levers $o^2$ $o^3$ carrying the bearing steps $o^4$, $o^4$, $o^5$, $o^5$ are arranged in such a manner that the length of the arms of these levers can be caused to vary for the following purpose:

In fact, it is necessary that the pressure exerted on the abutment flange $j^6$ should be less when it is the members $j^2$, $n$ of the direct drive which enter in action whilst, on the contrary, the pressure must be the greatest when it is the friction rollers $i$, $i^1$ which cooperate with the plate $j^1$.

What I claim as my invention and desire to secure by Letters Patent is:

1. In a progressive change speed gear, a driving shaft, two auxiliary shafts arranged in alignment with each other, on either side of the driving shaft and at right angles to the same, a bevel wheel rigidly secured on each auxiliary shaft, two bevel wheels loosely mounted on the driving shaft and engaging with the preceding bevel wheels, means for rendering rigid with the driving shaft one or the other of the loose bevel wheels, two friction rollers, means for mounting each of the said rollers respectively on each of the said auxiliary shafts so that these rollers are driven in rotation by the said auxiliary shafts, but may be displaced in translation on the latter, a driven shaft arranged in alignment with the driving shaft, a friction plate mounted on the driven shaft for driving it in rotation and adapted for frictionally engaging with the two friction rollers, a control lever adapted to rotate on a fixed axis, a toothed wheel, means for transmitting the rotation of the lever to the said toothed wheel, two racks parallel to each other and to the auxiliary shafts, gearing with the said toothed wheel at diametrically opposed points, means for transmitting to the rollers the translation of the racks.

2. In a progressive change speed gear, a driving shaft, two auxiliary shafts arranged in alignment with each other, on either side of the driving shaft, and at right angles to the same, a bevel wheel rigidly secured on each auxiliary shaft, two bevel wheels loosely mounted on the driving shaft and engaging with the preceding bevel wheels, a sliding clutching member driven in rotation by the driving shaft, but capable of being displaced in translation on the latter and of engaging with one or the other of the said loose bevel wheels, a lever for controlling the translation of the sliding clutching member, two friction rollers, means for mounting each of the said rollers respectively on each of the said auxiliary shafts, so that these rollers are driven in rotation by the latter, but may be displaced in translation on the same, a driven shaft arranged in alignment with the driving shaft, a friction plate mounted on the driven shaft for driving it in rotation and adapted for frictionally engaging with the two friction rollers, a control lever adapted to rotate on a fixed axis, a toothed wheel, means for transmitting the rotation of the lever to the said toothed wheel, two racks parallel to each other and to the auxiliary shafts, gearing with the said toothed wheels at diametrically opposed points, means for transmitting to the rollers the translation of the racks.

3. In a progressive change speed gear, a driving shaft, two auxiliary shafts arranged in alignment with each other on either side of the driving shaft and at right angles to the same, a bevel wheel rigidly secured on each auxiliary shaft, two bevel wheels loosely mounted on the driving shaft and engaging with the preceding bevel wheels, a sliding clutching member driven in rotation by the driving shaft, but capable of being displaced in translation on the latter and of engaging with one or the other of the said loose bevel wheels, a lever for controlling the translation of the sliding clutching member, two friction rollers, means for mounting each of the said rollers respectively on each of the said auxiliary shafts, so that these rollers are driven in rotation by the latter but may be displaced in translation on the same, a driven shaft arranged in alignment with the driving shaft, a friction plate mounted on the driven shaft for driving it in rotation and adapted for frictionally engaging with the two friction rollers, a control lever adapted to rotate on a fixed axis, a toothed wheel, means for transmitting the rotation of the lever to the said toothed wheel, two racks parallel to each other and to the auxiliary shafts, gearing with the said toothed wheels at diametrically opposed points, means for transmitting to the rollers the translation of the racks, a grooved cam rotating with the said toothed wheel, a roller carried by the control lever of the sliding clutching member and engaging with the groove of the said cam.

4. In a progressive change speed gear, a driving shaft, two auxiliary shafts arranged in alignment with each other on either side of the driving shaft and at right angles to the same, a bevel wheel rigidly secured on each auxiliary shaft, two bevel wheels loosely mounted on the driving shaft, and engaging with the preceding bevel wheels, a sliding clutching member driven in rotation by the driving shaft, but capable of being displaced in translation on the latter and of engaging with one or the other of the said loose bevel wheels, a lever for controlling the translation of the sliding clutching member, two friction rollers, means for mounting each of the said rollers respectively on each of the said auxiliary shafts, so that these rollers are driven in rotation by the latter but may be displaced in translation on the same, a driven shaft arranged in alignment with the driving shaft, a friction plate mounted on the driven shaft for driving it in rotation and adapted for frictionally engaging with the two friction rollers, a control lever adapted to rotate on a fixed axis, a toothed wheel, means for transmitting the rotation of the lever to the said toothed wheel, two racks parallel to each other and to the auxiliary shafts, gearing with the said toothed wheels at diametrically opposed points, means for transmitting to the rollers the translation of the racks, a grooved cam rotating with the said toothed wheels, a roller carried by the control lever of the sliding clutching member and engaging with the groove of the said cam, a gear case, enclosing the mechanism, jointed levers on this gear case springs exerting a traction on these levers for causing them to bear on the friction plate, an operating pedal, a link work connecting this pedal to the said levers for acting on them in antagonism with the springs.

5. In a progressive change speed gear, a driving shaft, two auxiliary shafts arranged in alignment with each other on either side of the driving shaft and at right angles to the same, a bevel wheel rigidly secured on each auxiliary shaft, two bevel wheels loosely mounted on the driving shaft and engaging with the preceding bevel wheels, a sliding clutching member driven in rotation by the driving shaft, but capable of being displaced in translation on the latter and of engaging with one or the other of the said loose bevel wheels, a lever for controlling the translation of the sliding clutching member, two friction rollers, means for mounting each of the said rollers respectively on each of the said auxiliary shafts, so that these rollers are driven in rotation by the latter but may be displaced in translation on the same, a driven shaft arranged in alignment with the driving shaft, a friction plate mounted on the driven shaft for driving it in rotation and adapted for frictionally engaging with the two friction rollers, a control lever adapted to rotate on a fixed axis, a toothed wheel, means for transmitting the rotation of the lever to the said toothed wheel, two racks parallel to each other and to the auxiliary shafts, gearing with the said toothed wheel at diametrically opposed points, means for transmitting to the rollers the translation of the racks, a grooved cam rotating with the said toothed wheels, a roller carried by the control lever of the sliding clutching member and engaging with the groove of the said cam, a gear case enclosing the mechanism, jointed levers on this gear case, springs exerting a traction on these levers for causing them to bear on the friction plate, an operating pedal, a link work connecting this pedal to the said levers for acting on them in antagonism with the springs, a female cone carried by the friction plate, a male cone carried by the driving shaft, a spring of small power acting between the two cones for spacing them apart.

6. In a progressive change speed gear, a driving shaft, two auxiliary shafts arranged in alignment with each other on either side of the driving shaft, and at right angles to the same, a bevel wheel rigidly secured on each auxiliary shaft, two bevel wheels loosely mounted on the driving shaft and engaging with the preceding bevel wheels, a sliding clutching member driven in rotation by the driving shaft, but capable of being displaced in translation on the latter and of engaging with one or the other of the said loose bevel wheels, a lever for controlling the translation of the sliding clutching member, two friction rollers, means for mounting each of the said rollers respectively on each of the said auxiliary shafts, so that these rollers are driven in rotation by the latter but may be displaced in translation on the same, a driven shaft arranged in alignment with the driving shaft, a friction plate mounted on the driven shaft for driving it in rotation and adapted for frictionally engaging with the two friction rollers, a control lever adapted to rotate on a fixed axis, a toothed wheel, means for transmitting the rotation of the lever to the said toothed wheel, two racks parallel to each other and to the auxiliary shafts, gearing with the said toothed wheel at diametrically opposed points, means for transmitting to the rollers the translation of the racks, a grooved cam rotating with the said toothed wheels, a roller carried by the control lever of the sliding clutching member and engaging with the groove of the said cam, a gear case enclosing the mechanism, jointed levers on this gear case, springs exerting a traction on these levers for causing them to bear on the friction plate, an operating pedal, a link work connecting this pedal to the said levers for acting on them in antagonism with the springs, a female cone carried by the friction plate, a male cone carried by the driving shaft, a spring of small power acting between the two cones for spacing them apart, two other jointed levers on the gear case and bearing against the ends of the auxiliary shafts, a spring acting between these levers for drawing them towards each other.

In testimony whereof I have signed my name to this specification.

NICOLAS GHERASSIMOFF.